Patented May 20, 1941

2,242,775

UNITED STATES PATENT OFFICE 2,242,775

PROCESS FOR THE MANUFACTURE OF HYDANTOINS

William G. Bywater, Detroit, Mich., assignor to Parke, Davis & Company, Detroit, Mich., a corporation of Michigan No Drawing. Application May 15, 1939, Serial No. 273,796

7 Claims. (Cl. 260—309)

The invention relates to the preparation of urea and thiourea derivatives, and more especially to a new simplified method of treating benzoins to convert them directly into 5,5-disubstituted hydantoins and thiohydantoins.

It is known that acyloins, such as benzoin, can be converted into hydantoins by first oxidizing the acyloin to a diketo compound of the type of benzil,

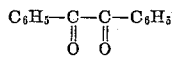

and thereafter condensing the diketone with urea.

The present invention has for its object a new process for the preparation of 5,5-diphenyl hydantoins and their corresponding thiohydantoin compounds of the following general formula,

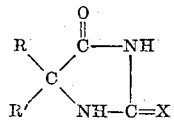

where X is O or S and R and R' are phenyl radicals which may or may not contain unreactive substituents such as ether groups.

Another object of the invention is to prepare compounds having the above mentioned formula by a direct process from a diphenyl acyloin, that is, from a benzoin, or its corresponding ether derivative, without the need for isolating intermediate diketone compounds.

A further object of the invention is to provide a more efficient process from the standpoint of yields, and also purity of products obtainable, than is possible by the use of the known processes.

I have found that benzoin or a derivative thereof in which a hydrogen atom attached to a nuclear carbon atom of one or both of the phenyl radicals is substituted by an unreactive group, such as an ether group, can be reacted with urea or thiourea in presence of an alkaline solution and in the presence of an oxidizing agent, such as a halogen oxy acid in the form of its alkali metal or ammonium salt, to directly obtain a 5,5-diphenyl hydantoin compound capable of being readily isolated in good yields and of high purity.

Typical of the transformations involved in the present process are those which occur when benzoin is reacted with potassium bromate in aqueous solution containing alkali metal hydroxide and which may be illustrated diagrammatically as follows:

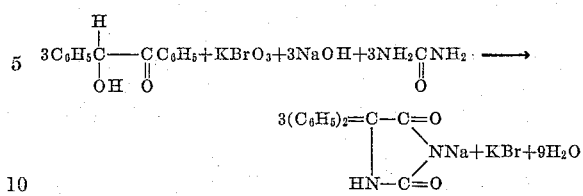

The invention can be illustrated by the following examples:

Example 1

Twenty-five grams of sodium hydroxide and 4.7 grams (0.0385 mole) of potassium chlorate are dissolved in 90 cc. of water in a 500 cc. three-necked round-bottom flask equipped with a mechanical stirrer and thermometer. To this hot solution is added 37.8 grams (0.63 mole) of urea and while stirring vigorously, 45 grams (0.21 mole) of crude benzoin (Organic syntheses, coll. vol. 1, p. 88). Stirring and heating on the steam bath with the temperature between 88° and 95°, is continued for 2.5 hours. The reaction product is now diluted with 500 cc. of cold water and filtered. The residue consisting of unreacted benzoin and a small amount of sodium diphenyl hydantoinate is extracted with 175 cc. of water containing 20 cc. of 10% sodium hydroxide solution. The combined filtrates are saturated with carbon dioxide and the crude diphenyl hydantoin weighing 5.2 grams when dry, is collected on a funnel. The product is best purified by treating it with a 5% excess of dilute sodium hydroxide and reprecipitating with carbon dioxide to secure pure 5,5-diphenyl hydantoin.

In a similar manner sodium chlorate may be used but it is preferable to use one-third of an equivalent of either oxidizing agent.

Example 2

A hot solution of 50 grams of sodium hydroxide and 11.5 grams (0.076 mole) of sodium bromate in 90 cc. of water is made in a small evaporating dish and placed on the steam bath. To this solution is added 19.8 grams (0.315 mole; 1.5 equivalents) of urea followed by 45 grams (0.21 mole) of crude benzoin in small portions. Stirring and heating is continued for 2.5 hours and 10 cc. of water is added to the red mixture every half hour during the heating to replace that lost by volatilization. The reaction mass is then diluted with 300 cc. of water, partially neutralized with 85 cc. of concentrated hydrochloric acid, and filtered. The residue is extracted first with 100 cc. of water and 20 cc. of 10% sodium hydroxide and finally with 75 cc. of water. The three filtrates when saturated with carbon dioxide give a 30.2% yield of diphenyl hydantoin.

When three equivalents of urea are employed, the yield is greatly improved.

*Example 3*

In a 5-liter three-necked flask equipped with a stirrer and arranged for heating with steam are placed 127 grams (0.76 mole) of potassium bromate, 250 grams (6.25 mole) of sodium hydroxide and 900 cc. of water. If the bromate does not dissolve as the solution becomes hot, the flask is heated at 80° until the bromate disappears. There is now introduced 378 grams (6.3 moles) of urea followed by 450 grams (2.1 moles) of crude benzoin. The benzoin is added in small portions over a period of 15-30 minutes. The oxidation and condensation start immediately and the temperature begins to rise. Usually after about two-thirds of the benzoin has been introduced, some foaming takes place and the temperature rise is quite rapid. External heating is temporarily no longer required. This rise causes no decrease in yield but the product contains more color and it is preferable to keep the temperature of the reaction mixture between 90° and 95° C.

About 20 minutes after all the benzoin has been introduced, the temperature of the thick reaction mixture begins to fall. External heating is again started and continued for 2.5-3.5 hours. The inside temperature during this time is held between 88° and 95° C.

To isolate the product the reaction mass is cooled slightly and transferred to a large open vessel, then diluted with 2.5 liters of ice water and thoroughly chilled. The semi-solid mass which consists of the sodium salt of diphenyl hydantoin and an alkali-insoluble by-product, is collected on a large suction funnel. The resulting filter cake is stirred mechanically for 30 minutes with 6 liters of water which has been buffered with 50 cc. of 10% sodium hydroxide solution, and filtered. The insoluble residue is extracted with one liter of water containing 20 cc. of 10% sodium hydroxide. The combined extracts are decolorized by stirring with charcoal and filtered. The treatment is repeated until no more color is removed by the charcoal. The 5,5-diphenyl hydantoin, precipitated from the solution with carbon dioxide is secured in 54% (50-70%) yield. It melts between 292° and 295° C. (with foaming; corr.) and agrees in all its properties with diphenyl hydantoin prepared by condensation of benzil and urea as described by Biltz (Ber. 41, 1379 (1908)).

As an alternative method, the crude sodium salt may be purified directly by dissolving it in a small volume of hot water containing a 5% excess of alkali, filtering, decolorizing with charcoal until no more color is removed and allowing the salt to crystallize by cooling to about 20° C. If necessary the process is repeated to secure pure sodium diphenyl hydantoinate.

*Example 4*

In a manner similar to that described in Example 3, 22.5 grams (0.105 mole) of benzoin are oxidized with 6.4 grams of potassium bromate and 12.5 grams of sodium hydroxide in 50 cc. of water and 100 cc. of methanol, in the presence of 18.9 grams of urea to give a 59% yield of crude diphenyl hydantoin which melts at 274° C. (with decomposition). In this instance, after the four-hour heating period is completed, the reaction mixture when cooled to room temperature does not precipitate the sodium salt. A small quantity of brown solid is filtered from the solution and the filtrate is diluted with 100 cc. of cold water and 10 cc. of 10% sodium hydroxide solution before the diphenyl hydantoin is precipitated with carbon dioxide.

*Example 5*

To a solution of 12.5 grams of sodium hydroxide in 50 cc. of water in a small evaporating dish is added 7.8 grams (0.0364 mole) of potassium iodate. With the temperature at 80°, 18 grams (0.3 mole) of urea and 21.2 grams (0.1 mole) of benzoin is introduced. Stirring is maintained for a few minutes and the dark red mixture soon sets to a thick semi-solid mass. Four 10 cc. portions of water are added during the three-hour heating period to facilitate stirring. At the end of the heating period, the reaction mixture is transferred to a beaker, diluted with 70 cc. of icewater and thoroughly chilled. The sodium salt is collected and the diphenyl hydantoin isolated as described in Example 3. The product secured through the use of potassium iodate turns brown while drying and it is necessary to reprecipitate it from a 5% solution of its sodium salt (containing a few crystals of sodium bisulfite) to remove the last traces of iodine or hypoiodate. The yield is 54.7% of 5,5-diphenyl hydantoin melting at 295° C. (corr., with foaming).

*Example 6*

To 5 cc. of a hot solution containing 0.6 gram (0.0036 mole) of potassium bromate and 1.2 grams (0.03 mole) of sodium hydroxide is added 1.8 grams (0.03 mole) of urea and 2.7 grams (0.01 mole) of anisoin (p,p'-dimethoxybenzoin). The mixture first becomes semi-solid but as stirring and heating are continued during 2 hours at 75° C. the bulk of material dissolves leaving a yellow flocculent solid. The reaction mass is diluted with 60 cc. of water and filtered. After decolorizing the filtrate with charcoal, the product is isolated as usual. The yield of crude slightly yellow, microcrystalline 5,5-dianisyl hydantoin is 1.4 grams or 52% of the theoretical which, when reprecipitated from a solution of its sodium salt, melts at 236.5-238° C.

*Example 7*

To the hot solution prepared by dissolving 12.5 grams (0.317 mole) of sodium hydroxide in 50 cc. of water in a 500 cc. three-necked round-bottom flask, is added 6.4 grams (0.038 mole) of potassium bromate and 23.9 grams (0.315 mole) of thiourea. Benzoin (22.5 grams; 0.105 mole) is slowly introduced while vigorously stirring. When all the latter has been poured into the mixture, the flask is heated on the steam bath for 3.5 hours, water being added occasionally to replace that lost by evaporation. To isolate the product, the red mixture is poured into 220 cc. of cold water, cooled thoroughly and filtered. The filtrate is treated twice with charcoal, filtered through a filter-aid, then saturated with carbon dioxide. The yield of crude, dry, 5,5-diphenyl-2-thiohydantoin is 14.7 grams which when recrystallized from alcohol, then reprecipitated from an alkaline solution melted at 236-237° C. A mixed melting point determination with 5,5-diphenyl-2-thiohydantoin prepared from benzil and thiourea shows no lowering.

It will be noted from the above examples that in some instances, and especially as described for Examples 3 and 5, the crude diphenyl hydantoin product in the form of its alkali metal salt precipitates out upon cooling the reaction mixture to room temperature and can be filtered off, redissolved and the diphenyl hydantoin itself precipitated from solution with an acidic substance of the type of carbon dioxide. In other cases, the reaction mixture when cooled is filtered and the filtrate treated with carbon dioxide to precipitate out the diphenyl hydantoin. In either instance, the yields of final product and the purity are substantially the same and are distinctly better than the results ordinarily obtained with the known process of making the diphenyl hydantoins.

The benzoin compound and the urea or thiourea can be used in various proportions, but it is preferred to use more than one equivalent of urea or thiourea for each mole of the benzoin reactant, since some of the urea is destroyed by the alkaline medium of the reaction. I prefer to use about three equivalents of urea or thiourea for each mole of the benzoin compound. Moreover, I have found it an advantage to use a slight excess of the calculated quantity of oxidizing agent.

The examples show the use of the preferred oxidizing agents, which are alkali metal or ammonium salts of halogen oxy acids such as chloric acid, bromic acid and iodic acid.

Instead of using a benzoin substituted in the phenyl radical by a methoxy group as described above under Example 6, other ethers of benzoin than anisoin may be used wherein the —OR substituent attached to the phenyl nucleus or nuclei is any other alkoxy group, such as ethoxy, propoxy, butoxy, polyether groupings such as dimethoxy, methylene dioxy, or an aryloxy or aralkoxy group. Furthermore, benzoins may be used where one of the hydrogen atoms attached to a nuclear carbon of one or both of the phenyl groups of benzoin is replaced by any unreactive radical other than an ether group.

The reaction of the benzoin compound with the urea or thiourea and the oxidizing agent is carried out in aqueous solution but neutral organic solvents may also be present such as alcohols, glycols and other polyhydroxy alcohols.

What I claim as my invention is:

1. Process for the preparation of 5,5-diphenyl hydantoins and 5,5-diphenyl thiohydantoins which comprises reacting a salt of a halogen oxy acid and a compound of the class consisting of urea and thiourea in the presence of an alkaline aqueous solution with a benzoin of formula,

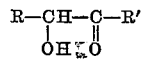

where R and R' are members of the group consisting of unsubstituted phenyl radicals and phenyl radicals having a hydrogen thereof replaced by a nonreactive substituent.

2. Process for the preparation of 5,5-diphenyl hydantoins and 5,5-diphenyl thiohydantoins which comprises reacting an oxidizing agent of the class consisting of chloric, bromic and iodic acids and the alkali metal and ammonium salts thereof and a compound of the class consisting of urea and thiourea in the presence of an alkaline aqueous solution with a benzoin of formula,

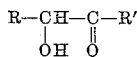

where R and R' are members of the group consisting of unsubstituted phenyl radicals and phenyl radicals having a hydrogen thereof replaced by a nonreactive substituent.

3. Process for the preparation of 5,5-diphenyl hydantoin and 5,5-diphenyl thiohydantoin which comprises reacting an oxidizing agent of the class consisting of bromic, chloric and iodic acids and the alkali metal and ammonium salts thereof with a compound of the class consisting of urea and thiourea and benzoin in presence of an alkaline aqueous solution.

4. Process for the preparation of 5,5-diphenyl hydantoin which comprises reacting an oxidizing agent of the class consisting of chloric acid, bromic acid and iodic acid and the alkali metal and ammonium salts thereof with urea and benzoin in an alkaline aqueous medium.

5. Process for the preparation of 5,5-diphenyl hydantoin which comprises reacting an alkali metal salt of bromic acid with urea and benzoin in presence of an alkaline aqueous solution.

6. The step which comprises reacting an alkali bromate in presence of an alkaline aqueous solution with benzoin and a compound of the class consisting of urea and thiourea.

7. Process for the preparation of 5,5-diphenyl hydantoins and 5,5-diphenyl thiohydantoins which comprises reacting an oxidizing agent of the class consisting of bromic, chloric and iodic acids and the alkali metal and ammonium salts thereof with a compound of the class consisting of urea and thiourea and a benzoin of formula,

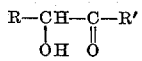

where R and R' are members of the group consisting of unsubstituted phenyl radicals and phenyl radicals having a hydrogen thereof replaced by a nonreactive substituent, in presence of an alkaline aqueous solution, said compound of the class consisting of urea and thiourea being present in excess of said benzoin.

WILLIAM G. BYWATER.